(12) United States Patent
Chen et al.

(10) Patent No.: US 8,956,086 B2
(45) Date of Patent: Feb. 17, 2015

(54) TOOLHOLDER ASSEMBLY WITH INTERNAL COOLANT DELIVERY SYSTEM

(71) Applicant: Kennametal Inc., Latrobe, PA (US)

(72) Inventors: Shi Chen, North Huntingdon, PA (US); Nicholas Joseph Henry, Latrobe, PA (US); Kent Peter Mizgalski, Stahlstown, PA (US)

(73) Assignee: Kennametal Inc., Latrobe, PA (US)

( * ) Notice: Subject to any disclaimer, the term of this patent is extended or adjusted under 35 U.S.C. 154(b) by 266 days.

(21) Appl. No.: 13/716,698

(22) Filed: Dec. 17, 2012

(65) Prior Publication Data

US 2014/0169890 A1 Jun. 19, 2014

(51) Int. Cl.
*B23B 27/10* (2006.01)
*B23Q 11/10* (2006.01)
*B23B 25/02* (2006.01)

(52) U.S. Cl.
CPC .................................. *B23Q 11/1023* (2013.01)
USPC ............................................. 407/11; 407/105

(58) Field of Classification Search
USPC ............................................. 407/11, 104, 105
See application file for complete search history.

(56) References Cited

U.S. PATENT DOCUMENTS

| 5,340,242 | A  | * | 8/1994 | Armbrust et al. | ............... | 407/11 |
| 6,053,669 | A  | * | 4/2000 | Lagerberg | ........................ | 407/11 |
| 8,573,098 | B2 | * | 11/2013 | Hoffer et al. | ...................... | 82/50 |
| 8,734,062 | B2 | * | 5/2014 | Henry et al. | .................... | 407/11 |
| 8,827,599 | B2 | * | 9/2014 | Henry et al. | .................... | 407/11 |
| 2011/0217131 | A1 | * | 9/2011 | Bonnarang et al. | ............. | 407/11 |

* cited by examiner

*Primary Examiner* — Will Fridie, Jr.
(74) *Attorney, Agent, or Firm* — Larry R. Meenan, Esq.

(57) ABSTRACT

A toolholder assembly includes a toolholder body having a coolant passage and a cutting insert seated within a recess of the body. The cutting insert includes an insert orifice extending between a top face and a bottom face that aligns with the coolant passage. A lock pin includes a lock pin orifice that aligns with and is in fluid communication with the coolant passage of the body. The lock pin orifice has an outlet port to allow the fluid to flow through the lock pin orifice and exit through the outlet port. A lock pin ring includes a coolant port in fluid communication with the outlet port of the lock pin to effectively discharge cooling fluid in the direction of a cutting area of the cutting insert.

17 Claims, 6 Drawing Sheets

TOOLHOLDER ASSEMBLY WITH INTERNAL COOLANT DELIVERY SYSTEM

BACKGROUND OF THE INVENTION

The invention relates in general to a toolholder assembly with an insert for cutting a workpiece and, in particular, to a toolholder assembly with an internal coolant deliver system to permit effective coolant delivery to an interface between the cutting area of the cutting insert and the workpiece.

Metal cutting tools for performing metal working operations generally comprise a cutting insert having a surface terminating at a cutting edge and a toolholder formed with a seat adapted to receive the insert. The cutting insert engages a workpiece and removes a chip therefrom. Obviously, it is desirable to lengthen the life of a cutting insert in metal cutting operations. Longer insert life leads to lower operating costs and better machine efficiency. One factor in the life of a cutting insert is the temperature of the insert during cutting operations. A higher insert temperature will result in a shorter useful life of an insert.

Many systems have been designed to lower the insert temperature during cutting. For example, coolants may be generally applied through nozzles directed at the cutting edge of the insert. The coolant contacting the chip serves not only to lower the temperature of the insert, but also to remove the chip from the cutting area. The farther the distance of the nozzle to the cutting edge, the more likely the chip will block the coolant from reaching the cutting area. The nozzles are often a distance of 1-12 inches away from the cutting edge. This is too far of a distance for effective cooling. The farther the coolant must be sprayed the more the coolant will mix with air and the less likely it will be to actually contact the tool-chip interface.

Some have improved cooling by directing high pressure and high volume coolant at the cutting edge. Others have designed grooves between the insert and a top plate that secures the insert in the holder to reduce the distance the coolant must be sprayed. Some have delivered liquid nitrogen as the coolant relatively near the cutting edge of an insert. Each variation has shown limited effectiveness. Many still are positioned to far from the tool-workpiece interface. Those with grooves between the top plate and the insert get fluid closer to the tool-workpiece interface, but are not close enough. Some designs are also limited in that the direction of fluid flow is almost completely limited to one plane. The liquid nitrogen systems have shown some benefit, but is cost prohibitive for most applications. It is clear there remains a need for a simple and effective assembly for insert cooling during metal cutting operations.

SUMMARY OF THE INVENTION

The inventor(s) have recognized the problems associated with conventional cooling apparatus and have developed a toolholder assembly that works with a conventional coolant system to deliver coolant to a cutting insert that addresses the problems of the prior art.

In one aspect of the invention, a toolholder comprises a body having a coolant passage for delivery of fluid; a cutting insert seated within a recess of the body, the cutting insert including at least one flank face, a top face, a bottom face, a cutting edge formed at an intersection between the at least one flank face and the top face, and an insert orifice extending between the top face and the bottom face that aligns with the coolant passage of the body; a lock pin at least partially disposed within the insert orifice, the lock pin including a lock pin orifice in fluid communication with the coolant passage of the body, the lock pin orifice having an outlet port to allow fluid flowing through the lock pin orifice to exit through the outlet port; and a lock pin ring disposed about the lock pin, the lock pin ring including a coolant port in fluid communication with the outlet port of the lock pin to allow coolant fluid flowing through the lock pin orifice to exit through the coolant port of the lock pin ring in a vicinity of the cutting corner of the cutting insert.

In another aspect of the invention, a toolholder comprises a body having a coolant passage for delivery of fluid; a cutting insert seated within a recess of the body, the cutting insert including at least one flank face, a top face, a bottom face, a cutting edge formed at an intersection between the at least one flank face and the top face, and an insert orifice extending between the top face and the bottom face that aligns with the coolant passage of the body; a shim disposed between the body of the toolholder and the cutting insert, the shim including a shim orifice extending between a top side and a bottom side and is aligned with the coolant passage of the body of the toolholder and the insert orifice of the cutting insert; a lock pin at least partially disposed within the insert orifice and the shim orifice, the lock pin including a lock pin orifice in fluid communication with the coolant passage of the body, the lock pin orifice having an outlet port to allow fluid flowing through the lock pin orifice to exit through the outlet port; and a lock pin ring disposed about the lock pin, the lock pin ring including a coolant port in fluid communication with the outlet port of the lock pin to allow coolant fluid flowing through the lock pin orifice to exit through the coolant port of the lock pin ring in a vicinity of the cutting corner of the cutting insert.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
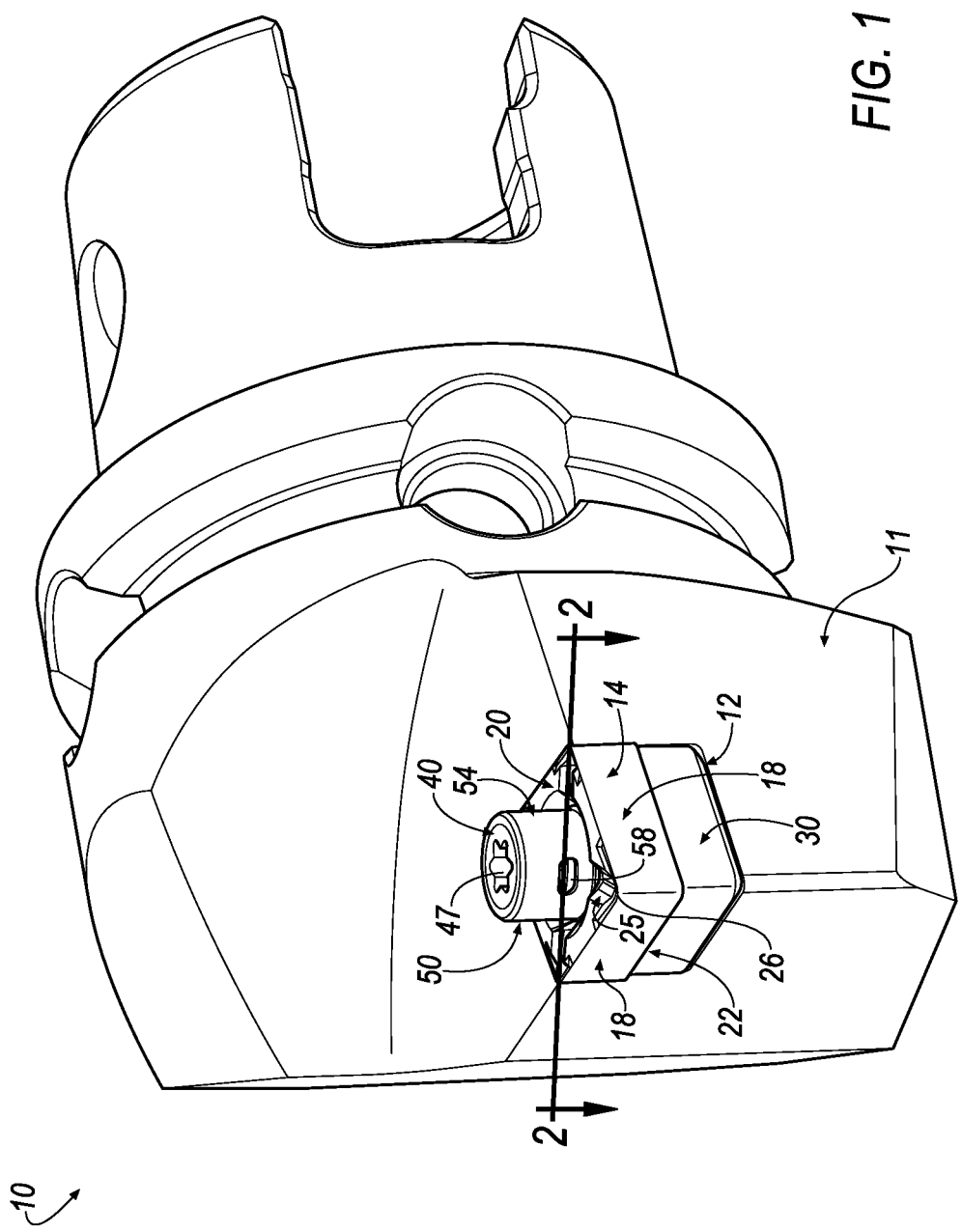
FIG. 1 shows a perspective view of a toolholder assembly with an internal coolant delivery system according to an embodiment of the invention.
Figure 2:
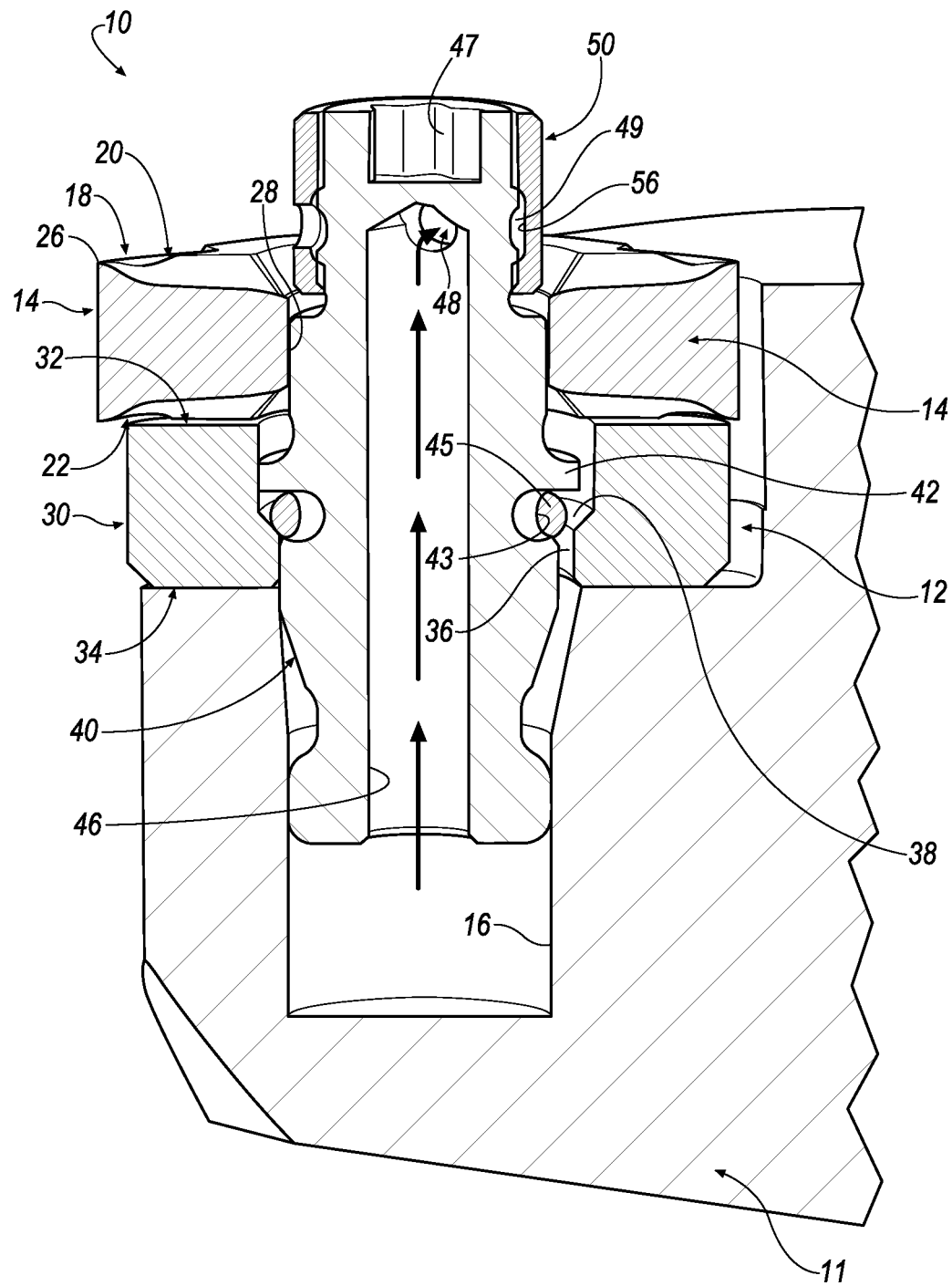
FIG. 2 is a cross-sectional view of the toolholder assembly taken along line 2-2 of FIG. 1.
Figure 3:
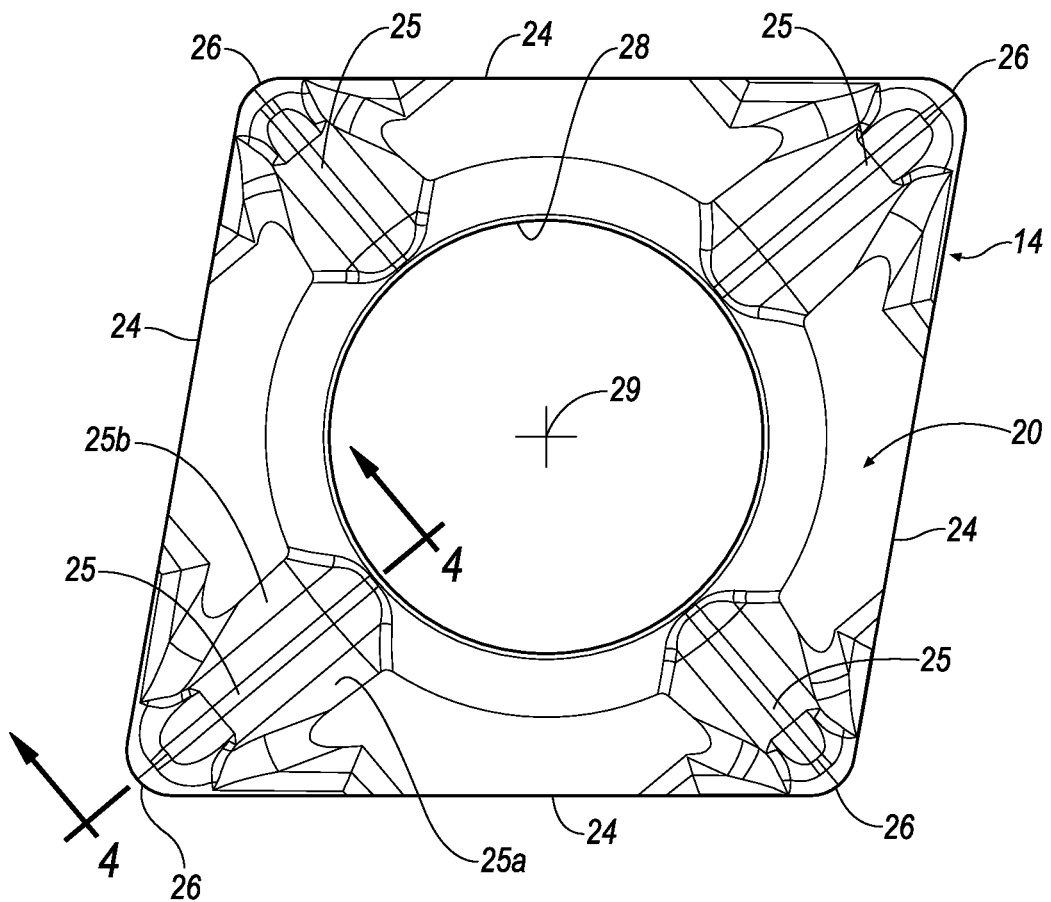
FIG. 3 is a top view of the cutting insert according to an embodiment of the invention.
Figure 4:
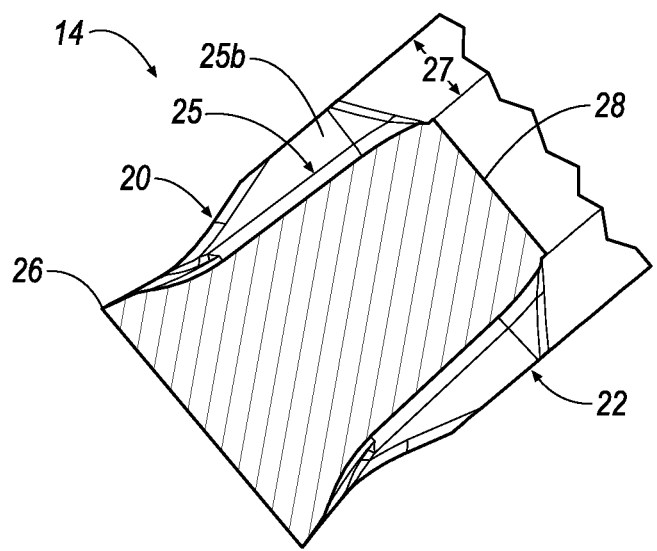
FIG. 4 is an enlarged cross-sectional view of the cutting insert taken along line 4-4 of FIG. 3.
Figure 5:
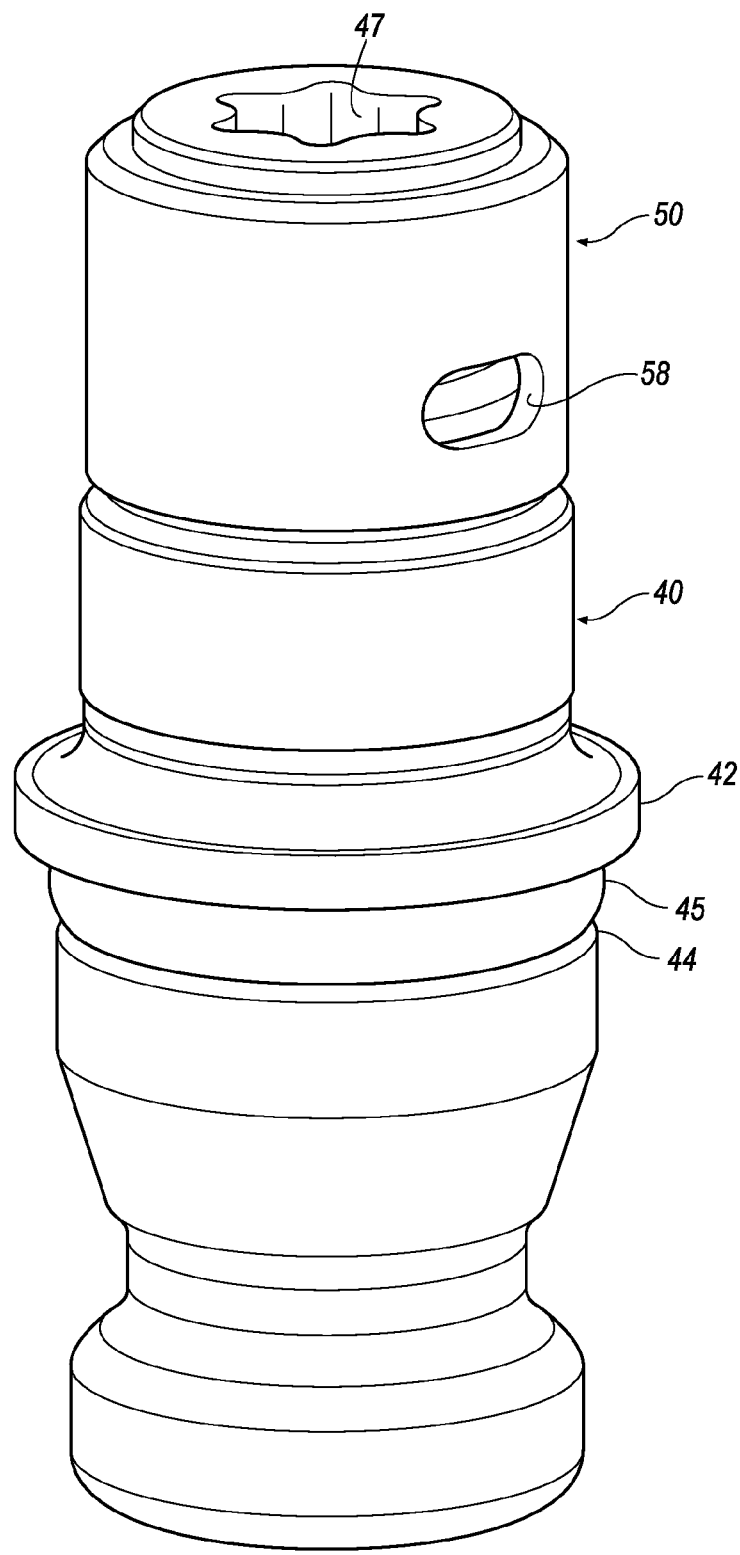
FIG. 5 is a side perspective view of the lock pin and lock pin ring according to an embodiment of the invention.
Figure 6:
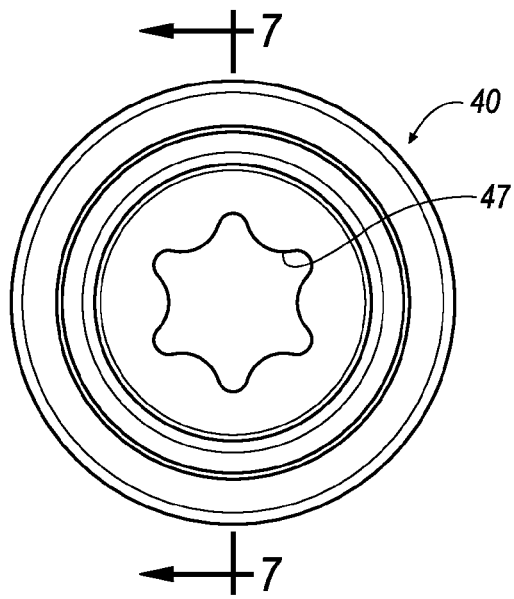
FIG. 6 is a top view of the lock pin according to an embodiment of the invention.
Figure 7:
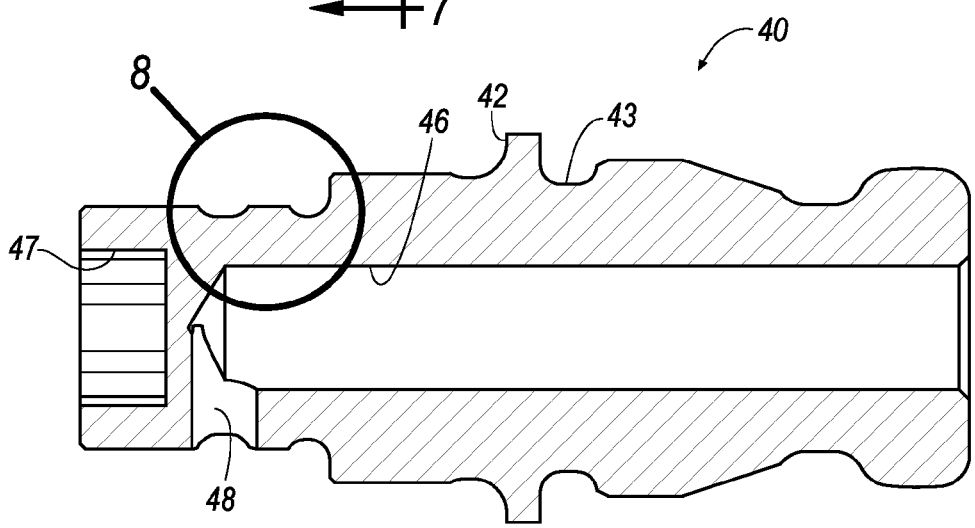
FIG. 7 is a cross-sectional view of the lock pin taken along line 7-7 of FIG. 6.
Figure 8:
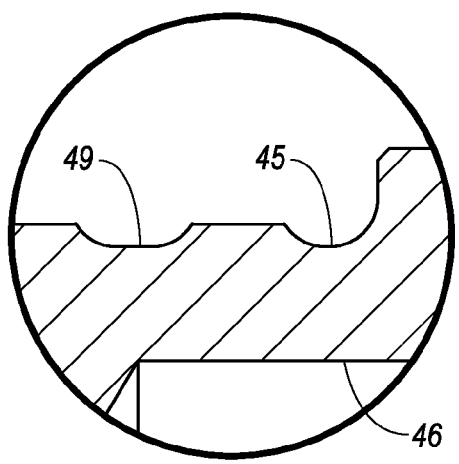
FIG. 8 is an enlarged view of the coolant groove of the lock pin of FIG. 6.
Figure 9:
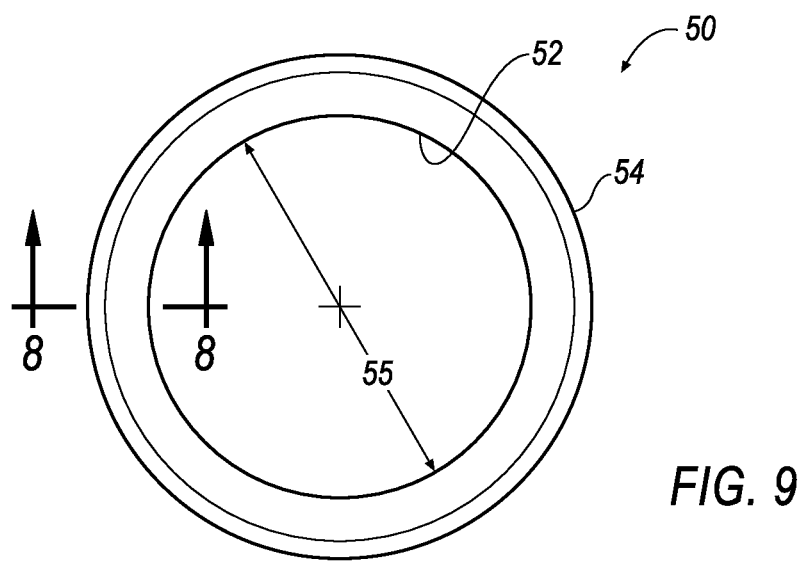
FIG. 9 is a top view of the lock pin ring according to an embodiment of the invention.
Figure 10:
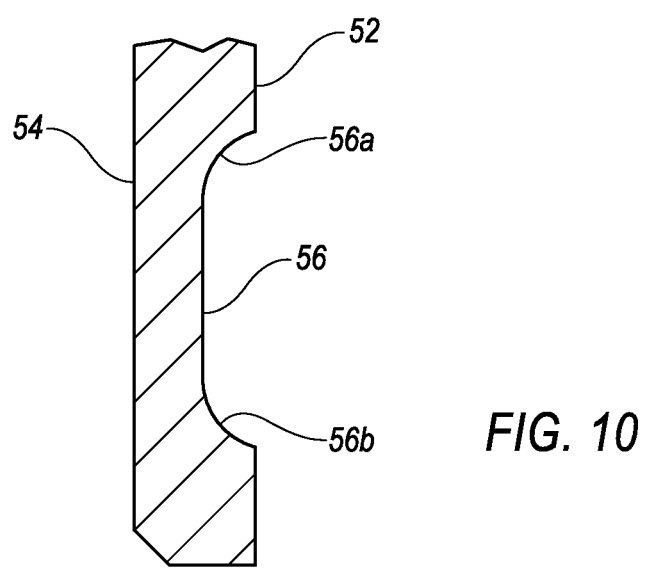
FIG. 10 is an enlarged cross-sectional view of the coolant groove of the lock pin ring of FIG. 9.

Referring now to FIGS. 1 and 2, a toolholder assembly 10 with a toolholder body 11 having a recess 12 for receiving an indexable cutting insert 14 is shown according to an embodiment of the invention. The body 11 of the toolholder assembly 10 also has a coolant passage 16 for delivering coolant to the recess 12. The coolant is in the form of a fluid, which can be either a liquid or gas.

Referring now to FIGS. 1-4, an indexable cutting insert 14 is seated within the recess 12. The cutting insert 14 has at least one flank face 18, a top face 20 and a bottom face 22. The intersection between the flank face 18 and the top face 20 forms a cutting edge 24. In the instance of a plurality of flank faces, the intersection between two adjacent flank faces 18 and the top face 20 forms a cutting corner 26. The cutting edge 24 and the cutting corner 26 comprises a cutting area of the cutting insert 14. The cutting insert 14 includes an insert orifice 28 extending between the top face 20 and the bottom face 22 that aligns with the coolant passage 16 of the body 11 of the toolholder assembly 10. The top face 20 and the bottom face 22 include a plurality of coolant channels 25 extending in a radial direction proximate the insert orifice 28 to proximate the cutting corner 26. The coolant channel 25 facilitates in directing fluid toward the cutting area (i.e., cutting edge 24 and cutting corner 26) of the insert 14. In the illustrated embodiment, the coolant channel 25 has a V-shaped profile having side walls 25a, 25b and a depth 27 that is largest proximate insert orifice 28 and smallest proximate the cutting corner 26. However, it will be appreciated that the coolant channel 25 can have any desirable profile to facilitate the flow of fluid toward the cutting area of the insert 14.

It will be appreciated that a round cutting insert does not include two adjacent flank faces and therefore does not include a cutting corner. Although a round cutting insert does not include a cutting corner it will be appreciated that in any case, a cutting edge is present. In one embodiment, the cutting edges 24 and the cutting corners 26 all lie within the same plane. It will be apparent that some of the cutting edges may also lie above or below one another in elevation. For example, this would be the case if an elliptically shaped insert with an uneven rake face were used as the cutting insert in the toolholder assembly 10.

It will be appreciated that the cutting insert 14 can be indexed to present a different cutting edge 24 and cutting corner 26 to the workpiece by rotating the cutting insert 180 degrees about a central axis 29. It will also be appreciated that the cutting insert 14 can also be indexed by turning the cutting insert 14 upside down such that the top face 20 that is shown in FIG. 1 becomes the bottom face 22, and bottom face 22 that is shown in FIG. 1 becomes the top face 20.

Referring back to FIGS. 1 and 2, a shim 30 is disposed between the body 11 of the toolholder assembly 10 and the cutting insert 14. The shim 30 is oriented such that a top side 32 abuts the cutting insert 14 and a bottom side 34 abuts the body 11 of the toolholder assembly 10. A shim orifice 36 extends between the top side 32 and the bottom side 34 and is aligned with the coolant passage 16 of the toolholder assembly 10 and the insert orifice 28 of the cutting insert 14. The shim 30 includes a shoulder 38 for engaging a lock pin, as described in further detail below. It will be appreciated that the shim 30 can be eliminated and the invention can be practiced without the need of the shim 30.

Referring now to FIGS. 1, 2 and 5-8, a lock pin 40 is at least partially disposed within the insert orifice 28 and the shim orifice 36 (in the embodiment in which the shim 40 is being used). The lock pin 40 includes a flange member 42 and a recess 44 for accommodating a sealing member 45, such as an O-ring and the like, to provide a fluid tight seal between the shim 30 and the lock pin 40 and prevent coolant fluid from passing therebetween. In addition, the flange member 42 acts as a stop when the O-ring 45 presses against the shim 30 to securely hold the shim 30 against the toolholder body 11.

Further, the lock pin 40 applies pressure to the cutting insert 14 in the direction of the pocket walls of the toolholder body 11 to securely hold the cutting insert 14 in the recess 12 when the lock pin 40 is screwed into the toolholder body 11. The lock pin 40 may also include a recess 47 that can be accessed by a tool, such as a TORX® wrench and the like, to screw and un-screw the lock pin 40. It will be appreciated that the invention is not limited by the means in which the lock pin 40 is installed onto the toolholder body 11, and that the invention can be practiced with any means well-known in the art.

One aspect of the invention is that the lock pin 40 includes a lock pin orifice 46 (FIG. 1) that aligns with and is in fluid communication with the coolant passage 16 of the toolholder body 11 of the toolholder assembly 10. The lock pin orifice 46 has an outlet port 48 at one end to allow fluid entering the lock pin orifice 46 at one end to flow through the lock pin orifice 46 and exit through the outlet port 48 (as indicated by the arrows in FIG. 1).

Referring now to FIGS. 1, 2, 5, 9 and 10, a lock pin ring 50 is disposed about the lock pin 40. The lock pin ring 50 is generally annular in shape and has an inner surface 52 and an outer surface 54. The lock pin ring 50 has an outer diameter 55 that is smaller than the diameter of the insert orifice 28 so that the cutting insert 14 can be removed from the toolholder body 11 without the need to remove the lock pin ring 50. The inner surface 52 includes a coolant groove 56 for receiving the fluid passing through the outlet port 48 of the lock pin 40. The lock pin ring 50 is assembled onto the lock pin 40 by snapping the lock pin ring 50 into a groove 45 in such a way that a coolant groove 49 of the lock pin 40 is aligned with the coolant groove 56 of the lock pin ring 50. In addition, the coolant groove 56 includes a pair of upward sloping side walls 56a, 56b that engage the outer surface of the lock pin 40 in such a way as to form a fluid tight seal between the lock pin 40 and the lock pin ring 50.

Another aspect of the invention is that the lock pin ring 50 includes a coolant port 58 extending between the inner and outer surfaces 52, 54. Specifically, the coolant port 58 is located within the coolant groove 56 to allow fluid flowing through the lock pin 40 and into the lock pin ring 50 to exit through the coolant port 58 of the lock pin ring 50. It is noted that the lock pin ring 50 can be rotated relative to the lock pin 40 before the lock pin 40 is completely tightened. By rotating the lock pin ring 50 relative to the lock pin 40, the coolant port 58 of the lock pin ring 50 can be positioned relative to the outlet port 48 of the lock pin 40 to allow the cooling fluid exiting from the coolant port 58 to be directed toward the coolant groove 25 and effectively delivered to the cutting area (i.e. the cutting edge 24 and cutting corner 26) of the cutting insert 14.

The lock pin 40 and lock pin ring 50 of the invention enable coolant fluid to be effectively delivered to the cutting insert 14 without the need of a top plate, thereby reducing the manufacturing cost of the toolholder assembly 10. In addition, the lock pin 40 and the lock pin ring 50 of the invention correctly position the direction that the coolant is delivered to the cutting insert 14. Further, the lock pin 40 and lock pin ring 50 of the invention is capable of effectively delivering both conventional coolant fluid and inert gas to the cutting insert 14.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A toolholder assembly, comprising:
a toolholder body having a coolant passage for delivery of coolant fluid;
a cutting insert seated within a recess of the body, the cutting insert including at least one flank face, a top face, a bottom face, a cutting edge formed at an intersection between the at least one flank face and the top face, and an insert orifice extending between the top face and the bottom face that aligns with the coolant passage of the body;
a lock pin at least partially disposed within the insert orifice, the lock pin including a lock pin orifice in fluid communication with the coolant passage of the body, the lock pin orifice having an outlet port to allow coolant fluid flowing through the lock pin orifice to exit through the outlet port; and
a lock pin ring disposed about the lock pin, the lock pin ring including a coolant port in fluid communication with the outlet port of the lock pin to allow coolant fluid flowing through the lock pin orifice to exit through the coolant port of the lock pin ring in a direction of a cutting area of the cutting insert.

2. The toolholder according to claim 1, further comprising a shim disposed between the body of the toolholder and the cutting insert.

3. The toolholder according to claim 2, wherein the shim includes a shim orifice extending between a top side and a bottom side and is aligned with the coolant passage of the body of the toolholder and the insert orifice of the cutting insert.

4. The toolholder according to claim 2, wherein the lock pin includes a flange member that engages a shoulder of the shim to securely hold the shim against the body of the toolholder.

5. The toolholder according to claim 1, wherein the cutting insert includes a coolant groove that receives the coolant fluid exiting the coolant port of the lock pin ring.

6. The toolholder according to claim 1, wherein the cutting insert is indexable.

7. The toolholder according to claim 1, wherein the lock pin includes an upper flange member that engages a detent of the lock pin ring to securely hold the cutting insert against the body of the toolholder.

8. The toolholder according to claim 1, wherein the lock pin ring is rotatable relative to the lock pin to allow the the coolant fluid flowing through the lock pin orifice to exit through the coolant port of the lock pin ring in the direction toward the cutting area of the cutting insert.

9. The toolholder according to claim 1, wherein the coolant port of the lock pin ring can be positioned relative to the outlet port of the lock pin to allow the cooling fluid exiting from the coolant port to be directed to the coolant groove and effectively delivered toward the cutting area of the cutting insert.

10. A toolholder, comprising:
a toolholder body having a coolant passage for delivery of coolant fluid;
a cutting insert seated within a recess of the body, the cutting insert including at least one flank face, a top face, a bottom face, a cutting edge formed at an intersection between the at least one flank face and the top face, and an insert orifice extending between the top face and the bottom face that aligns with the coolant passage of the body;
a shim disposed between the body of the toolholder and the cutting insert, the shim including a shim orifice extending between a top side and a bottom side and is aligned with the coolant passage of the body of the toolholder and the insert orifice of the cutting insert;
a lock pin at least partially disposed within the insert orifice and the shim orifice, the lock pin including a lock pin orifice in fluid communication with the coolant passage of the body, the lock pin orifice having an outlet port to allow fluid flowing through the lock pin orifice to exit through the outlet port; and
a lock pin ring disposed about the lock pin, the lock pin ring including a coolant port in fluid communication with the outlet port of the lock pin to allow coolant fluid flowing through the lock pin orifice to exit through the coolant port of the lock pin ring in a direction of a cutting area of the cutting insert.

11. The toolholder according to claim 10, wherein the cutting insert includes a coolant groove that receives the fluid exiting the coolant port of the lock pin ring.

12. The toolholder according to claim 10, wherein the cutting insert is indexable.

13. The toolholder according to claim 10, wherein the shim includes a shim orifice extending between a top side and a bottom side and is aligned with the coolant passage of the body of the toolholder and the insert orifice of the cutting insert.

14. The toolholder according to claim 10, wherein the lock pin includes a flange member that engages a shoulder of the shim to securely hold the shim against the body of the toolholder.

15. The toolholder according to claim 10, wherein the lock pin includes an upper flange member that engages a detent of the lock pin ring to securely hold the cutting insert against the body of the toolholder.

16. The toolholder according to claim 10, wherein the lock pin ring is rotatable relative to the lock pin to allow the the coolant fluid flowing through the lock pin orifice to exit through the coolant port of the lock pin ring in the direction toward the cutting area of the cutting insert.

17. The toolholder according to claim 10, wherein the coolant port of the lock pin ring can be positioned relative to the outlet port of the lock pin to allow the cooling fluid exiting from the coolant port to be directed to the coolant groove and effectively delivered toward the cutting area of the cutting insert.

* * * * *